United States Patent
Khan et al.

(10) Patent No.: US 10,306,399 B2
(45) Date of Patent: May 28, 2019

(54) SUPPORTING AN UPDATE OF RADIO MAP DATA

(71) Applicant: HERE Global B.V., Eindhoven (NL)

(72) Inventors: Muhammad Irshan Khan, Tampere (FI); Lauri Aarne Johannes Wirola, Tampere (FI); Pavel Ivanov, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/477,607

(22) Filed: Apr. 3, 2017

(65) Prior Publication Data

US 2018/0288561 A1 Oct. 4, 2018

(51) Int. Cl.
*H04W 4/02* (2018.01)
*H04B 17/309* (2015.01)
*H04B 17/27* (2015.01)

(52) U.S. Cl.
CPC .............. *H04W 4/02* (2013.01); *H04B 17/27* (2015.01); *H04B 17/309* (2015.01)

(58) Field of Classification Search
None
See application file for complete search history.

(56) References Cited

U.S. PATENT DOCUMENTS

| | | | | | |
|---|---|---|---|---|---|
| 5,978,462 | A * | 11/1999 | Fuhrmann | ............... | H04M 3/51 379/115.01 |
| 7,774,028 | B1 * | 8/2010 | Pfister | ..................... | H04L 41/12 455/447 |
| 2003/0163542 | A1 * | 8/2003 | Bulthuis | ................. | G08C 19/28 709/208 |
| 2005/0246334 | A1 | 11/2005 | Tao et al. | | |
| 2011/0211563 | A1 * | 9/2011 | Herrala | ................. | H04W 4/029 370/338 |
| 2012/0166241 | A1 * | 6/2012 | Livingston | ......... | G06Q 10/0631 705/7.12 |
| 2014/0092765 | A1 | 4/2014 | Agarwal et al. | | |
| 2015/0067136 | A1 | 3/2015 | Chang et al. | | |

(Continued)

OTHER PUBLICATIONS

Did your access point break? Quick replace it!, https://www.tanaza.com/features/access-point-quick-replacement/, pp. 1-3, Oct. 3, 2016.

(Continued)

*Primary Examiner* — German Viana Di Prisco
(74) *Attorney, Agent, or Firm* — Lempia Summerfield Katz LLC (57) ABSTRACT

A system receives user input based information that allows deriving an identifier of a first radio transmitter, wherein a database stores, associated with the identifier of the first radio transmitter, information that allows deriving expected characteristics of radio signals of the first radio transmitter at different locations of a site. The system moreover receives a user input based indication of a replacement of the first radio transmitter at the site. The system receives user input based information that allows deriving an identifier of a second radio transmitter replacing the first radio transmitter at the site. The system updates the database by associating the information that allows deriving expected characteristics of radio signals of the first radio transmitter at different locations of the site with the identifier of the second radio transmitter.

16 Claims, 4 Drawing Sheets

(56) References Cited

U.S. PATENT DOCUMENTS

| | | |
|---|---|---|
| 2016/0161592 A1 | 6/2016 | Wirola et al. |
| 2016/0337945 A1* | 11/2016 | Watt ...................... H04W 48/16 |
| 2017/0181254 A1* | 6/2017 | Meitl ................. H05B 37/0272 |
| 2017/0188188 A1* | 6/2017 | Kang .................... H04W 4/021 |

OTHER PUBLICATIONS

Goffert van Gool, Accuracy Characterization for Wifi Localization inChanging Environments, pp. 1-7, 21st Twente Student Conference on IT Jun. 23, 2014.

Large scale deployment instruction, https://www.sensoro.com/en/developer, pp. 1-3, Oct. 3, 2016.

* cited by examiner

SUPPORTING AN UPDATE OF RADIO MAP DATA

FIELD OF THE DISCLOSURE

The disclosure relates to the field of positioning and more specifically to supporting an update of radio map data.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

A WLAN based positioning solution, for instance, may be divided in two stages, a training stage and a positioning stage.

In the training stage, learning data is collected. The data may be collected in the form of fingerprints that are based on measurements by mobile devices. A fingerprint may contain a position estimate and measurements taken from a radio interface. The position estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. A crowd-sourcing based training stage may enable an exhaustive survey of a site, for instance all floors, spaces and rooms of a building, in a short time at limited costs. Alternatively or in addition, mobile devices may be used for collecting fingerprints in a systematic manner. Collected fingerprint data may be uploaded to a database in a server or in the cloud, where algorithms may be run to generate radio models of WLAN access points and/or radio maps for positioning purposes.

In the positioning stage, a mobile device may estimate its current position based on own measurements taken from the radio interface and on the data or a subset of data that is available from the training stage. Model data or radio map data that has been generated in the training stage may be transferred to mobile devices by a server via the Internet as assistance data for use in position determinations. Alternatively, model data and/or radio map data may be stored in a positioning server to which the mobile devices may connect to via the Internet for obtaining a position estimate.

A similar approach could be used for a positioning that is based on other types of terrestrial radio transmitters or on a combination of different types of terrestrial radio transmitters.

SUMMARY OF SOME EMBODIMENTS OF THE INVENTION

An example embodiment of a method comprises receiving user input based information that allows deriving an identifier of a first radio transmitter, wherein a database stores, associated with the identifier of the first radio transmitter, information that allows deriving expected characteristics of radio signals of the first radio transmitter at different locations of a site. The method moreover comprises receiving a user input based indication of a replacement of the first radio transmitter at the site. The method moreover comprises receiving user input based information that allows deriving an identifier of a second radio transmitter replacing the first radio transmitter at the site. The method moreover comprises updating the database by associating the information that allows deriving expected characteristics of radio signals of the first radio transmitter at different locations of the site with the identifier of the second radio transmitter. The method may be performed by at least one apparatus.

An example embodiment of a first system comprises means for causing performance of the actions of any embodiment of the presented method. The means may be distributed to one or more apparatuses. Thus, the system may be a single apparatus or an assembly of a plurality of apparatuses.

The means of the system may be implemented in hardware and/or software. They may comprise for instance a processor for executing computer program code for realizing the required functions, a memory storing the program code, or both. Alternatively, they may comprise for instance circuitry that is designed to realize the required functions, for instance implemented in a chipset or a chip, like an integrated circuit.

An example embodiment of a second system comprises at least one processor and at least one memory including computer program code, the at least one memory and the computer program code configured to, with the at least one processor, cause at least one device at least to perform the actions of any embodiment of the presented method. The at least one processor and/or the at least one memory may belong to a single apparatus, like a server, or be distributed to several apparatuses.

Any of the described systems may comprise only the indicated components or one or more additional components, like a memory for the database. Any of the described systems may be an apparatus, be a part of an apparatus or be composed of a plurality of apparatuses.

Moreover an example embodiment of a non-transitory computer readable storage medium, in which computer program code is stored, is presented. The computer program code causes at least one device to perform the actions of any embodiment of the presented method when executed by at least one processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer or like an integrated or exchangeable memory card, or it may be intended for distribution of the program code, like an optical disc or memory stick or memory card.

It is to be understood that any embodiment of the computer program code by itself has to be considered an example embodiment of the invention as well. The computer program code could also be distributed to several computer readable storage mediums.

In certain embodiments, any of the presented methods is an information providing method, and any of the presented first systems is an information providing system. In certain embodiments, the means of the presented first system are processing means.

In certain embodiments, any of the presented methods is a method for supporting the update of radio map data. In certain embodiment, any of the presented systems is a system for supporting the update of radio map data.

It is to be understood that any feature presented for a particular example embodiment may also be used in combination with any other described example embodiment of any category and any aspect.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
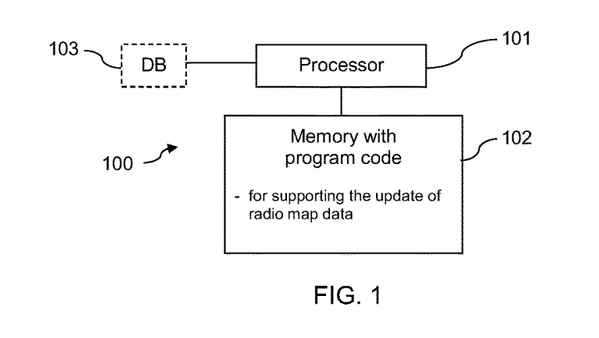
FIG. 1 is a schematic block diagram of an example embodiment of an apparatus.

FIG. 1 is a schematic block diagram of an example embodiment of a system 100 according to the disclosed embodiments. System 100 comprises at least one processor 101 and, linked to the at least one processor 101, at least one memory 102. The at least one memory 102 stores computer program code for supporting an update of radio map data. The computer program code may be example computer program code according to the disclosed embodiments, and the at least one memory 102 may be an example computer readable medium according to the disclosed embodiments. The at least one processor 101 is configured to execute computer program code stored in the at least one memory 102 in order to cause at least one device to perform desired actions. Processor 101 is linked to a database 103. Database 103 may or may not be a part of system 100.

System 100 may be a device, like a computer, or a combination of devices, like computers in the Cloud. System 100 may equally be a module, like a chip, circuitry on a chip or a plug-in board, for a device. Optionally, system 100 may comprise various other components, like a data interface, a user interface, a further memory, a further processor, etc.

An example operation of system 100 will now be described with reference to the flow chart of FIG. 2. The operation is an example embodiment of a method according to the disclosed embodiments. The at least one processor 101 and the program code stored in the at least one memory 102 cause at least one device to perform the operation when program code is retrieved from the at least one memory 102 and executed by the at least one processor 101. The at least one device that is caused to perform the operation may be or belong to system 100, or comprise system 100.

The at least one device receives user input based information that allows deriving an identifier of a first radio transmitter, wherein a database stores, associated with the identifier of the first radio transmitter, information that allows deriving expected characteristics of radio signals of the first radio transmitter at different locations of a site. (action 201) Thus, the stored information may be considered radio map data.

The at least one device receives a user input based indication of a replacement of the first radio transmitter at the site. (action 202)

The at least one device receives user input based information that allows deriving an identifier of a second radio transmitter replacing the first radio transmitter at the site. (action 203)

It is to be understood that actions 201, 202 and 203 may be carried out in any order.

The at least one device updates the database by associating the information that allows deriving expected characteristics of radio signals of the first radio transmitter at different locations of the site with the identifier of the second radio transmitter. (action 204)

The disclosed embodiments address problems with radio transmitters may impair positioning solutions that rely on radio signals transmitted by the radio transmitters. Problems with radio transmitters may involve hardware failures, battery outages, a loss of radio transmitters, and other problems. A radio transmitter having such a problem will also be referred to as a broken radio transmitter. Problems with a radio transmitter may cause a gap in radio coverage of a site, and gaps in the radio coverage worsen the positioning performance.

Re-filling the gaps in radio coverage requires installing new radio transmitters and re-surveying the coverage area of the transmitter. Re-surveying requires visiting the entire coverage area of the broken transmitter. A coverage area of a transmitter often comprises multiple floors, and a surveyor has to spend a good amount of time to visit the entire coverage area for re-surveying. The problem becomes severe, if the coverage area is not freely accessible. In that case, either the gap may not be filled properly, or it may take more time to get access to the restricted area and to recover the positioning performance.

Certain embodiments therefore provide that in the case of a broken radio transmitter at a site, a new radio transmitter is installed at the location of the broken radio transmitter, and that stored data about the radio environment previously created by the broken radio transmitter is reused for the new radio transmitter.

Certain embodiments may have the effect that a reliable positioning may be enabled again significantly faster and cheaper than by re-surveying the affected area.

Figure 2:
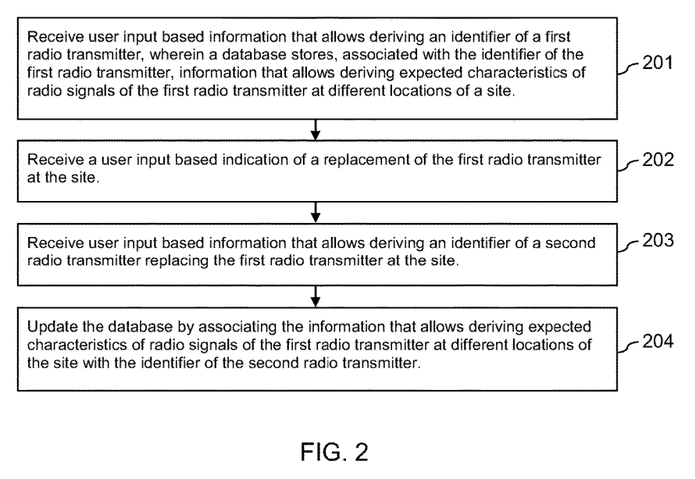
FIG. 2 is a flow chart illustrating an example embodiment of a method.

System 100 illustrated in FIG. 1 and the method illustrated in FIG. 2 may be implemented and refined in various ways.

The site may be an indoor site, but it may equally be an outdoor site or comprise outdoor areas.

In an example embodiment, both new and old radio transmitter have the same hardware—that is, they are of the same type—and use the same configuration. This may have the effect that the old data fits perfectly to the new radio transmitter.

The radio transmitter may be any kind of terrestrial transmitter, in particular, though not exclusively, any kind of non-cellular terrestrial transmitter. In example embodiments, the radio transmitter is a wireless local area network access point or a Bluetooth™ beacon or a Bluetooth beacon enabling Bluetooth low energy mode or a Bluetooth low energy beacon. The radio transmitter may be one of a plurality of radio transmitters distributed at the site. The radio transmitters may be of the same or of different types.

WLAN access points and Bluetooth beacons are already installed in many buildings. Furthermore, WLAN and Bluetooth technologies are supported by many mobile user devices by default, like by most smartphones, tablets, laptops and feature phones. Evaluating the received signal strength of signals transmitted by WLAN access points, Bluetooth beacons and/or BLE beacons may thus have the effect that the determined reference locations may be based in some embodiments on an existing infrastructure in buildings and/or be exploited with existing capabilities in many mobile devices. As a result, the approach may be globally scalable and have low maintenance and deployment costs. The deployment of new infrastructure, including for example beacons and tags, is possible but not necessary. In addition, the end-user experience may be acceptable with these technologies, since a horizontal positioning accuracy of 2-3 meters as well as close to 100% reliability in floor detection may be achieved. The radio transmitters may be stand-alone devices or be integrated into or attached to some other device. The use of Bluetooth low energy may limit the energy consumption at all involved devices. A Bluetooth beacon that is employed for the disclosed embodiments may be any kind of Bluetooth beacon complying with any present or future standard.

It is to be understood, however, that other types of radio transmitters than variations of WLAN access points or Bluetooth beacons may be used as well, for instance tags or other devices that are configured to transmit ultra-wideband (UWB) signals or ultra-sound signals or any wireless signals that might emerge in the future.

If the radio transmitters comprise alternatively or in addition a cellular transmitter, any of the radio transmitters may be for instance a base station of a Global System for Mobile Communications (GSM) network, of a CDMA2000 network, of a Universal Mobile Telecommunications System (UMTS) network, of a long term evolution (LTE) network, or of any other current or future kind of cellular network.

The considered characteristics of radio signals of the radio transmitter may be of different kinds. They may be for instance received signal strengths of radio signals. The expected characteristics of radio signals may thus comprise for example expected received signal strengths of radio signals. A received signal strength may be represented for instance by a received signal strength indication (RSSI) or a physical Rx level in dBm with a reference value of 1 mW, etc. Alternatively, the expected characteristics of radio signals may comprise for example expected path losses of radio signals at particular locations.

Furthermore, the information that allows deriving expected characteristics of radio signals of the first radio transmitter at different locations of a site may be available in different forms. It may be for instance in the form of parameter values of a radio model. Such parameter values may include for instance a location of the radio transmitter and a path loss value. Alternatively, it may be for instance in the form of a grid based radio map, with characteristics values stored for some or all of the grid points.

Example embodiments support preceding actions of receiving results of measurements on radio signals by at least one mobile device at different locations at the site, and creating the information that allows deriving expected characteristics of radio signals of the first radio transmitter at different locations of a site based on the results of measurements. This may have the effect that the information that allows deriving expected characteristics of radio signals of the first radio transmitter at different locations may be very accurate. The results of measurements may be received for instance in the form of fingerprints. The at least one mobile device may comprise a mobile device of survey personnel and/or a mobile device of a user who agreed to collect and provide measurement results in a crowd-sourcing approach.

In example embodiments, the information in the updated database is used for determining a position of a mobile device at the site. This may have the effect that the positioning can be based on complete data on the radio environment at a site basically immediately after a replacement of a radio transmitter.

In example embodiments, updating the database comprises replacing the identifier of the first radio transmitter with the identifier of the second radio transmitter in a database entry, which associates the information that allows deriving expected characteristics of radio signals of the first radio transmitter at different locations of the site with the identifier of the first radio transmitter. This may have the effect that the update is particularly simple.

In example embodiments, the database comprises a database entry associating the information that allows deriving expected characteristics of radio signals of the first radio transmitter at different locations of the site with the identifier of the first radio transmitter. Updating the database may then comprise adding a database entry associating the information that allows deriving expected characteristics of radio signals of the first radio transmitter at different locations of the site with the identifier of the second radio transmitter. Updating the database may further comprise in this case deleting the database entry associating the information that allows deriving expected characteristics of radio signals of the first radio transmitter at different locations of the site with the identifier of the first radio transmitter. This may have the effect that it facilitates tracking updates in the system.

In example embodiments, receiving user input based information that allows deriving an identifier of the second radio transmitter comprises receiving an identifier of the second radio transmitter based on a manual input of a user to a device or based on an output of a tool reading the identifier from the second radio transmitter.

In example embodiments, receiving user input based information that allows deriving an identifier of the first radio transmitter comprises receiving an identifier of the first radio transmitter based on a manual input of a user to a device or based on an output of a tool reading the identifier from the first radio transmitter.

Providing a tool for reading the identifier from a radio transmitter may be particularly comfortable to the user and less error prone than a manual input. Such a tool may comprise for instance a scanner or camera of a device that is able to capture a barcode or a two-dimensional code attached to the radio transmitter; or a Bluetooth or near field communication module for receiving an electronically stored identifier of the radio transmitter. On the other hand, a radio transmitter usually has its identifier written on a label that is attached to the transmitter. Enabling a user to read the identifier and to enter the identifier manually to a device may have the effect that the implementation is particularly simple and that no additional tools and/or applications are required. Furthermore, it may also work with a broken first radio transmitter, when reading an electronic identifier is not possible anymore.

In further alternative example embodiments, receiving user input based information that allows deriving the identifier of the first radio transmitter comprises causing a presentation of a map on a display of a device, the map including a visualization of locations of a plurality of radio transmitters at the site, for which a respective database entry is stored in the database, each database entry associating information that allows deriving expected characteristics of radio signals of a radio transmitter at different locations of the site with an identifier of the radio transmitter. It further comprises receiving an input indicating one of the locations presented on the display. It further comprises determining an identifier of a radio transmitter at the indicated location as the identifier of the first radio transmitter. This may have the effect that an identifier can be determined in any case, even if a label with the identifier or code externally attached to the first radio transmitter is not available or not readable anymore; and if the first radio transmitter is broken to such an extent that reading an electronic code, if available, is not possible anymore. Furthermore, even if the identifier is present on a label and readable, it avoids the need for a user to type in the identifier at the site using a mobile device. It is also possible that there are multiple collocated transmitters (or transmitters at a very close proximity to each other), and hence it may not be straightforward to determine a selected location corresponding to the transmitter being replaced. In this case multiple transmitters' identifiers may be provided in return to user location input (or user can go through identifiers or locations one by one), and the identifier of the replaced transmitter can be at least determined, for example, by the way of exclusion of the identifiers of the transmitters that are still operational, i.e. provide their identifiers via radio interface. If there are multiple such transmitters which are not operational, i.e. do not provide their identifiers, then any of them may be considered as being replaced, and its identifier is chosen as the first transmitter identifier. Other non-operational transmitters can be replaced subsequently in the same way. Determining an identifier of a radio transmitter at the indicated location as the identifier of the first radio transmitter may thus comprise determining identifiers of a plurality of radio transmitters at the indicated location, causing a presentation of the determined identifiers on a display of the device and detecting a user selection of one of the identifier as the identifier of the first radio transmitter. The locations of the plurality of radio transmitters are associated with a respective identifier of a radio transmitter in a memory. The locations of the plurality of radio transmitters may be stored for instance in the same database or in a different database as the mentioned database entries. If stored in the same database, they may be for instance a part of the information that allows deriving expected characteristics of radio signals of a radio transmitter at different locations of the site or they may be provided in a separate field of each database entry. Further alternatively, they may be stored for instance in separate database entries that only associate a respective identifier of a radio transmitter with an indication of a location.

Figure 3:
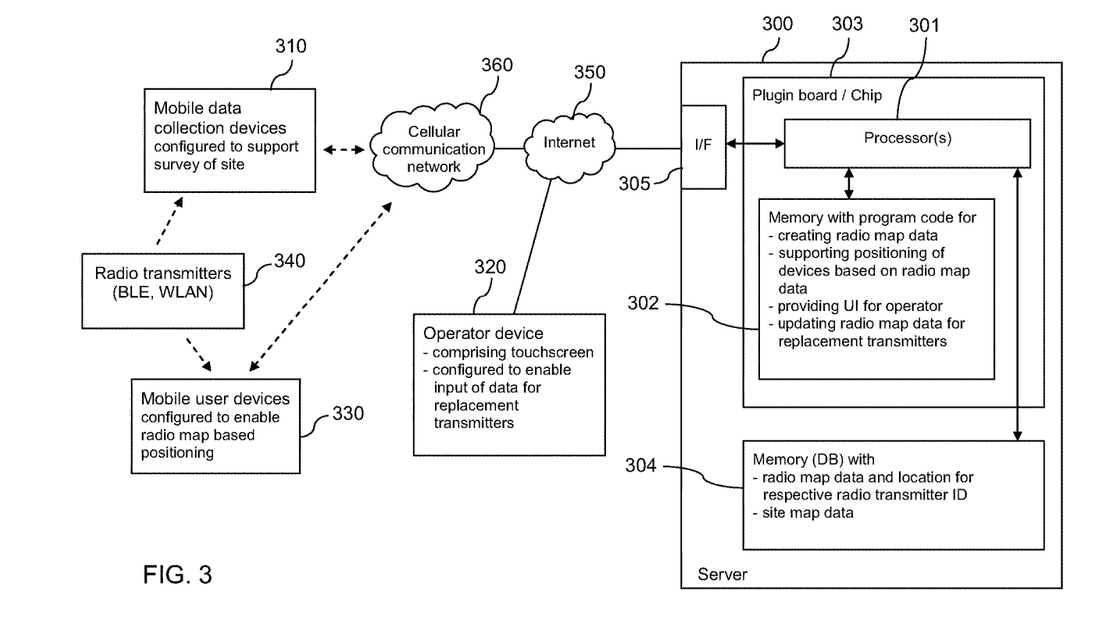
FIG. 3 is a schematic block diagram of an example embodiment of a system.

FIG. 3 is a schematic block diagram of an example embodiment of a system supporting creation and update of radio map data for a site, for instance a large building like a shopping-mall.

The system comprises a server 300, mobile data collection devices 310, an operator device 320 and mobile user devices 330. It is to be understood that a mobile device may support any combination of the functions associated with devices 310 and 330. The system further comprises a plurality of radio transmitters 340. The Internet 350 may enable a connection between server 300 and other devices. A mobile communication network 360 and/or at least one WLAN may enable mobile devices to access the Internet 350 and thus server 300.

Server 300 may be for instance a dedicated location server or another type of specialized server. It may be provided for a particular site or for a plurality of sites. Server 300 comprises a processor 301 that is linked to a first memory 302, to a second memory 304, and to an interface 305.

Processor 301 is configured to execute computer program code, including computer program code stored in memory 302, in order to cause server 300 to perform desired actions. It is to be understood that processor 301 may comprise or have access to a working memory for this purpose, for example in the form of a random access memory (not shown).

Memory 302 stores computer program code for creating radio map data, computer program code for supporting a positioning of mobile devices based on stored radio map data, computer program code for providing a radio map control user interface (UI) and computer program code for updating radio map data for replaced transmitters. Memory 302 may also store any other kind of computer program code. Memory 302 may also store for instance an operating system for server 300. In addition, memory 302 may store any kind of data.

Processor 301 and memory 302 may optionally belong to a module 303, like a plug-in board or a chip or an integrated circuit or any other kind of processing circuitry, which may comprise in addition various other components, for instance a further processor or a further memory.

Memory 304 is configured to store data of a database (DB), including grid based radio map data associated with a respective radio transmitter identifier (ID). Memory 304 may store other data as well, like locations associated with a respective radio transmitter ID and site map data for one or more sites. In addition, memory 304 may also store any other kind of data, for instance received fingerprint data. It is to be understood that some or all of the data could also be stored in a database that uses a memory external to server 300.

Interface 305 is configured to enable a communication with other devices, for instance via the Internet 350.

It is to be understood that server 300 may comprise various other components, like a user interface.

It is to be understood that the functions of server 300 may also be performed in the cloud in a distributed manner.

Server 300 may be a computer that constitutes a system according to the disclosed embodiments, or that is a part of a system according to the disclosed embodiments, or that comprises a system according to the disclosed embodiments, for instance in the form of module 303.

The radio transmitters 340 may, for instance, be or belong to WLAN access points of at least one WLAN and/or BLE beacons. They may be distributed at the site such that at least one radio transmitter may be observed at essentially each location of the site at which a positioning of mobile user devices 330 is to be supported. Each of the radio transmitters 340 may be configured to transmit radio signals at regular intervals. These radio signals are provided to be used by mobile user devices 330 for positioning purposes. Optionally, they may be used for other purposes in addition.

A mobile data collection device 310 may be for instance a regular mobile terminal, like a smartphone or general purpose tablet PC. The user of mobile data collection device 310 may belong to survey personnel or be any user who agreed to support crowd-sourcing at one or more sites and who downloaded a corresponding application.

Each mobile data collection device 310 comprises a BLE and/or WLAN module. Each mobile data collection device 310 comprises optionally a satellite navigation system module and/or a cellular module. It may comprise various further components, like sensors and/or a user interface. The BLE module of mobile data collection device 310 is configured to receive radio signals transmitted by BLE beacons 340. The WLAN module of mobile data collection device 310 is configured to communicate with WLAN access points 340. The satellite navigation system module of mobile data collection device 310 may be configured to receive corresponding satellite signals and to determine the current position of mobile device 310 based on the signals, possibly using provided assistance data. The cellular module of mobile data collection device 310 may be configured to enable a communication with nodes of cellular communication network 360. Such a cellular module may be provided alternatively or in addition to a WLAN module. The WLAN module and/or the cellular module may enable mobile survey device 310 to access server 300 via a WLAN or cellular communication network 360 and further via the Internet 350.

Operator device 320 may be a mobile device, like a smartphone or a general purpose tablet PC. Alternatively, it may be a stationary device, like a desktop computer or a stationary terminal of a server integrated in a local area network. Operator device 320 comprises a touchscreen or a display and other input means, like a keypad. It may be configured to access server 300 for instance via the Internet 350. Alternatively, it may be configured to access server 300 for instance via a cellular communication network 360 and/or some WLAN and further via the Internet 350. Alternatively, it may be configured to access server 300 for instance via a local area network. If operator device 320 is a mobile device, it may optionally be configured as a mobile data collection device 310 as well.

Mobile user devices 330 represent devices that may desire to know their own position at the site. The position may be requested for instance by an internal application or by some other device. Any of mobile user devices 330 may be for instance a regular mobile terminal, like a smartphone or general purpose tablet PC, or it may be for instance an Internet of Things (IoT) device, like a smart watch or a smart band, etc. It is configured to perform measurements on signals transmitted by at least one type of radio transmitters 340. It is further configured to compute its own position based on radio map data provided by server 300 and/or to obtain a computed position from server 300 upon request. Any of mobile user devices 330 may be configured to access server 300 for instance via a cellular communication network 360 and/or some WLAN and further via the Internet 350.

Figure 4:
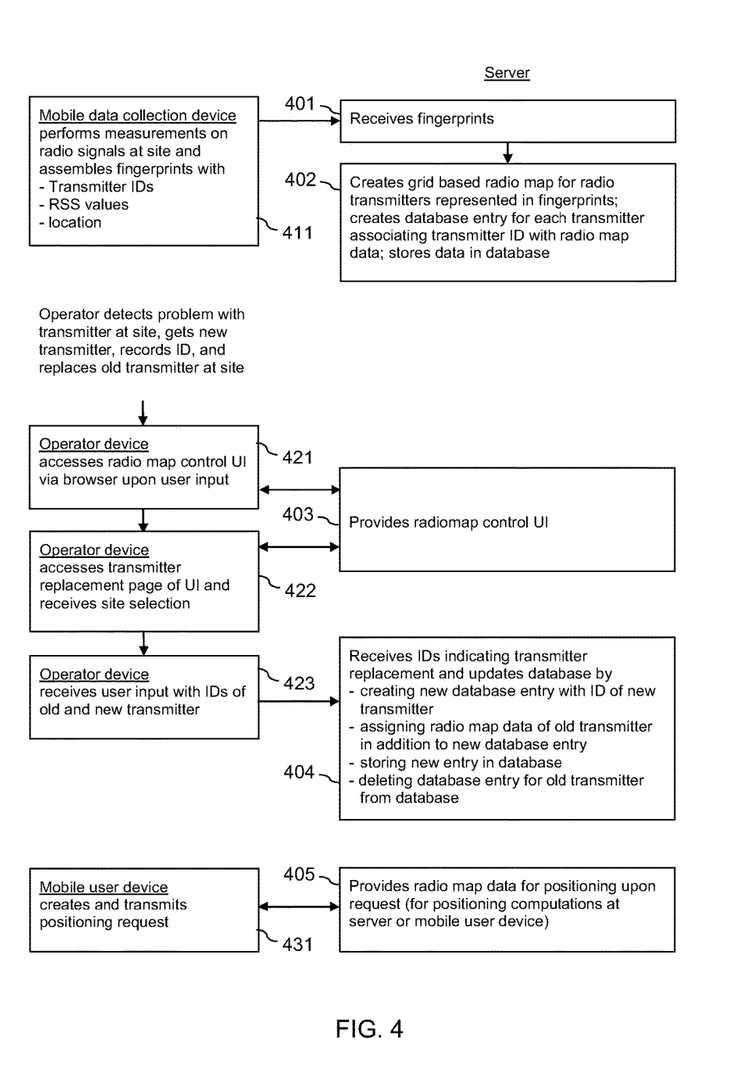
FIG. 4 is a flow chart illustrating a first example embodiment of operations in the system of FIG. 3.

FIG. 4 is a flow chart illustrating first example operations in the system of FIG. 3. Processor 301 and some of the program code stored in memory 302 cause server 300 to perform the actions presented on the right hand side when corresponding program code is retrieved from memory 302 and executed by processor 301. At least one mobile data collection device 310, operator device 320 and a mobile user device 330 are caused to perform the actions presented on the left hand side.

At the site, all radio transmitters 340 regularly transmit radio signals including at least their identifier (ID). The identifier may be for instance a medium access control (MAC) address of a transmitting BLE beacon, or a basic service set identification (BSSID) of a WLAN access point in the form of a MAC address or of a random number.

At least one mobile data collection device 310 performs measurements on the radio signals at regular intervals while the user of the device 310 moves around at the site. The measurement results include in each instance the IDs of radio transmitters 340 of which signals are currently detected and RSS values of the detected signals. For each instance, a fingerprint is assembled including an indication of a location of measurement and radio transmitter IDs associated with a respective RSS value. (action 411) Additional information, like timestamps may be included as well. The indication of location may be determined in any suitable manner; it may be based e.g. on a user input, on satellite signals (including for instance of a global and/or local navigation system, like GPS, GLONASS, Galileo, Beidou and/or the quasi-zenith satellite system (QZSS), etc.) and/or on signals of one or more sensor (including for instance a barometer, accelerometers, etc.) and information on the site (including for instance information on a number and height of floors, on inter-floor connectors like stairs, elevators, escalators, etc.).

Mobile data collection device 310 transmits the assembled fingerprints to server 300. The data may be transmitted for instance periodically, or when the user deactivates the application, or when it is detected that mobile data collection device 310 leaves the site. The transmission may take place for instance via the cellular network 360 or a WLAN and the Internet 350.

Server 300 receives fingerprints from the at least one mobile data collection device 310. (action 401) The fingerprint data may be stored in memory 304.

Server 300 generates a grid based radio map for each radio transmitter 340 for which RSS values have been received in fingerprints in action 401. Each grid is defined to cover the site such that each grid point corresponds to a geographical location at the site. If the site comprises several floors, a separate grid may be defined for each floor, or a single three dimensional grid may be defined with one dimension for each of the different floors. Each grid based radio map may be generated by mapping the RSS value(s) for a respective radio transmitter ID to the grid point that corresponds to a geographical location that is closest to the position indicated in the fingerprint comprising the RSS value. If there are several RSS values for the radio transmitter 340 that would be mapped to the same grid pint, some kind of average value may be used, for instance the arithmetic mean or the median value. For grid points to which no RSS values could be mapped due to missing fingerprints from the corresponding areas at the site, RSS values may be generated by interpolating surrounding RSS values if possible, and by extrapolating neighboring RSS values otherwise. It is to be understood that these supplementing computations may be limited to an assumed maximum coverage area of the radio transmitter 340. Server 300 stores the grid based radio map data in memory 304. Server 300 creates a database entry for each radio transmitter 340 associating the transmitter ID with a link to the radio map data, and stores the database entry in memory 304. (action 402)

An example part of code for creating a database that includes a radio map table with database entries for various radio transmitters 340 is presented in the following for illustration. The code is, by way of example, in the form of MySQL commands. The radio map table comprises for each database entry a field for a MAC address as identifier of a radio transmitter, a field for a link to the radio map data for a radio transmitter and a field for an indication of the time of creation of the database entry. The presented MySQL commands add a database entry for a radio transmitter with ID "MAC_1" with associated radio map data "Radio map of MAC1" that has been created based on fingerprint data:

```
CREATE DATABASE Radio_map_database;
MySQL [(none)]> Use Radio_map_database;
MySQL [Radio_map_database]> CREATE TABLE radio _map_table(MAC CHAR(200),
Radio_Map CHAR(200), Created DATETIME);
MySQL [Radio_map_database]> INSERT INTO radio_map_table(MAC, Radio_Map,
Created) VALUES ('MAC_1', 'radiomap of MAC1',NOW( ));
MySQL [Radio_map_database]> SELECT * FROM radio_map_table;
```

The resulting original radio map database may thus have the following format and content:

| Radio_map_database radio_map_table | | |
|---|---|---|
| MAC | Radio_Map | Created |
| MAC_1 | Radio map of MAC1 | 02/1/2017 10:39 |

It is to be understood that a database entry corresponding to the database entry for the radio transmitter with ID "MAC_1" is generated for each of the radio transmitters 340 for which radio map data has been generated based on the fingerprints received in action 401.

The data may then be used for positioning mobile user devices 330. (actions 405, 431) This action will be described in more detail further below.

At some point, the operator may detect a problem with one of the radio transmitters 340 at the site. It is to be understood that the term operator as used here refers to personnel of the operator. The operator may note for instance that the positioning performance is poor in some area of the radio transmitter. Alternatively, the operator may monitor all radio transmitters 340. Such a monitoring may be performed on site by obtaining control samples; or it may comprise a communication with the radio transmitters 340. The operator obtains a new radio transmitter, preferably of the same type, and records the ID of the new radio transmitter. As far as adjustable, the operator selects the same configuration settings for the new radio transmitter as used for the old radio transmitter. The configuration settings may relate for instance to the employed radio frequency and to the employed transmission power. In the case of an Eddystone compliant BLE beacon, the ID may be Namespace and Instance ID. The ID may be recorded for instance manually based on a label attached to the radio transmitter, which indicates the ID. Alternatively, the ID may be recorded by scanning a code on the radio transmitter. The operator then replaces the broken radio transmitter at the site.

Upon a corresponding input by the operator, operator device 320 then accesses a radiomap control UI via a browser. (action 421) Alternatively, the radio map control UI could be accessed using a dedicated application program (app) installed on operator device 320.

As a result, server 300 provides the radiomap control UI and controls supported interactions. (action 403)

Based on an input by the operator, operator device 320 further accesses specifically a transmitter replacement page of the UI. On this page, the operator is caused to indicate the site, at which a transmitter has been replaced. (action 422) In case server 300 supports a single site only, or a single site only for the registered operator, this query may be omitted.

Furthermore, the operator is caused by the UI to input the ID of the old radio transmitter as well as the ID of the new radio transmitter. (action 423) The ID of the old radio transmitter may be input manually or by means of a tool, as described for the ID of the new radio transmitter. The operator may obtain the ID of the new radio transmitter from the previous recording or enter the ID again. Alternatively, the ID of the new radio transmitter may only be recorded at this time.

Thereupon, server 300 updates the database. (action 404) To this end, server 300 creates a new database entry for the new radio transmitter. The new database entry has the ID of the new radio transmitter as a key word. Server 300 associates the radio map data of the old radio transmitter in addition to the new radio transmitter in the new database entry. That is, a link to this data may be included in the new database entry. The new database entry is then stored in the database in memory 304.

The following example MySQL commands add a database entry for a replacement radio transmitter with ID "MAC_2" with associated radio map data "Radio map of MAC1" that has been created based on fingerprint data collected for the old radio transmitter with ID "MAC_1".

```
INSERT INTO radio_map_table (MAC, Radio_Map) SELECT "MAC_2", Radio_Map
FROM radio_map_table WHERE MAC="MAC_1";
UPDATE radio_map_table SET Created=NOW( ) WHERE MAC='MAC_2';
```

The resulting intermediate database may have the following format and content:

| Radio_map_database radio_map_table | | |
|---|---|---|
| MAC | Radio_Map | Created |
| MAC_1 | Radio map of MAC1 | 02/1/2017 10:39 |
| MAC_2 | Radio map of MAC1 | 02/1/2017 10:48 |

Finally, server 300 deletes the database entry for the old radio transmitter in the database from memory 304 for completing the database update.

The following example MySQL command deletes the database entry for the replaced radio transmitter with ID "MAC_1" from the database:

DELETE FROM radio_map_table WHERE MAC='MAC1';

The resulting updated database may have the following format and content:

| Radio_map_database radio_map_table | | |
|---|---|---|
| MAC | Radio_Map | Created |
| MAC_2 | Radio map of MAC1 | 02/1/2017 10:48 |

A mobile user device 330 may perform measurements on radio signals at a certain location at the site. The measurements may include an identifier of all radio transmitters 340 of which radio signals are detected at the location, and an RSS value of the respectively detected radio signal. Mobile user device 330 may send the measurement results to server 300 along with a positioning request and receive a computed position in response. (action 431)

Server 300 provides the radio map data of the most recent version of the database for positioning of a mobile user device 330 upon request. (action 405) If the request includes a positioning request comprising measurement results, server 300 may perform the required positioning computations. To this end, it may determine the location at the site, at which expected RSS values of all radio transmitters 340 registered in the database fit best to the measured RSS values. This location may then be provided as estimated position to mobile user device 330.

Alternatively, mobile user device 330 may request and receive the radio map data for the site and take care of the positioning computations itself.

Figure 5:
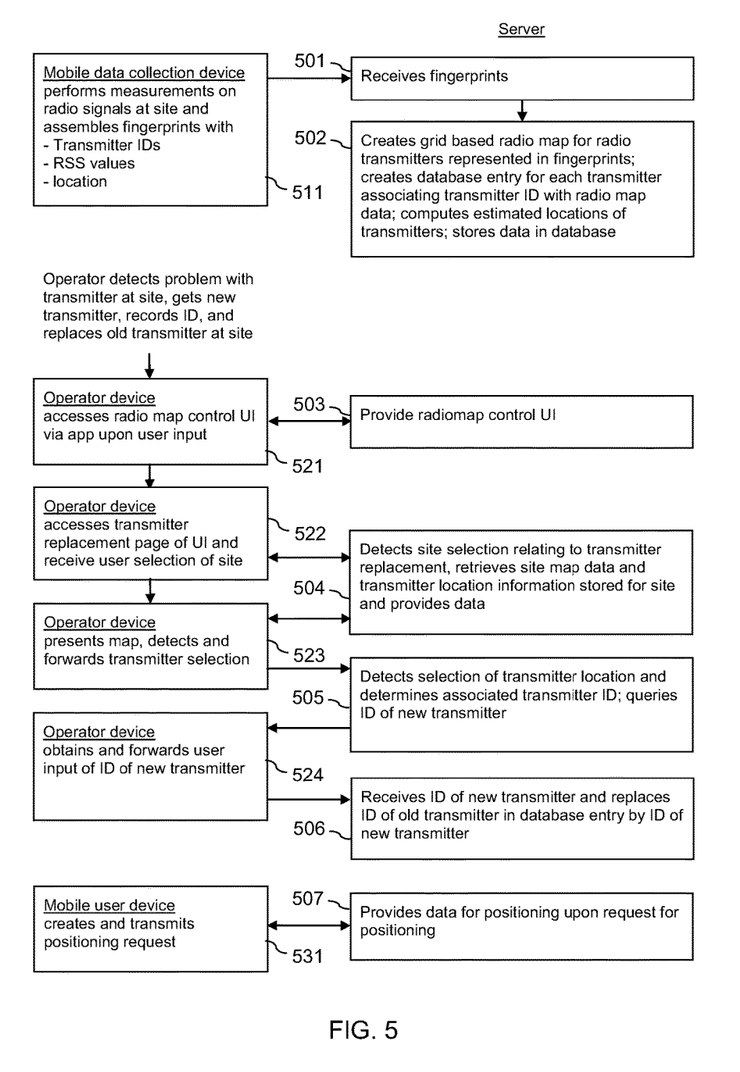
FIG. 5 is a flow chart illustrating a second example embodiment of operations in the system of FIG. 3.

FIG. 5 is a flow chart illustrating second example operations in the system of FIG. 3. Processor 301 and some of the program code stored in memory 302 cause server 300 to perform the actions presented on the right hand side when corresponding program code is retrieved from memory 302 and executed by processor 301. At least one mobile data collection device 310, operator device 320 and a mobile user device 330 are caused to perform the actions presented on the left hand side. The operations are similar to the operations of FIG. 4, so mainly the differences will be described.

In this embodiment, all radio transmitters 340 at the site equally transmit radio signals including at least their identifier (ID).

Furthermore, at least one mobile data collection device 310 assembles fingerprints at the site and transmits them to server 300, as described with reference to action 411. (action 511)

Server 300 receives fingerprints from the at least one mobile data collection device 310. (action 501) The fingerprint data may be stored in memory 304.

Server 300 generates a grid based radio map for each radio transmitter 340 for which RSS values have been received in fingerprints in action 501, as described with reference to action 402. An example resulting database may correspond to the original radio map database presented with reference to action 402. In addition, server 300 determines in this case an estimated location of each of the radio transmitters 340. (action 502)

Server 300 may estimate the location of radio transmitters 340 in different ways based on the received fingerprints. For instance, the location of a radio transmitter 340 may be estimated to correspond to the average of the estimated positions in those fingerprints, which comprise RSS values for the radio transmitter 340 in question. The average may optionally be a weighted average. The selected weights may, for instance, be inversely proportional to uncertainties of the positions in the fingerprints. Alternatively, the selected weight for an estimated position in a fingerprint may, for instance, be proportional to the RSS value associated with the identifier of the radio transmitter 340 in the fingerprint on a linear scale. The estimated locations of the radio transmitters 340 are equally written into memory 304. They may be stored for instance in a separate database or in a separate portion of the database. In a variation, they could also be stored in a further column of the radio_map_table presented above.

At some point, the operator may detect again a problem with one of the radio transmitters 340 at the site and replace the broken radio transmitter with a new radio transmitter of the same type.

Upon an input by the operator, operator device 320 then accesses a radio map control UI via application software, which automatically establishes a connection to server 300 when launched. (action 521)

As a result, server 300 provides the radiomap control UI and controls supported interactions. (action 503)

Based on an input by the operator, operator device 320 presents a transmitter replacement page of the UI. On this page, the operator is caused to indicate the site, at which a radio transmitter has been replaced. (action 522)

Server 300 detects the site selection via the replacement page, which indicates to server 300 that the site selection relates to a transmitter replacement. As a result, server 300 retrieves stored site map data for the selected site and stored radio transmitter location information for the selected site from memory 304. The retrieved data is transmitted to operator device 320. (action 504)

Upon receipt of this data, operator device 320 presents a map of the site on a display. The locations of the radio transmitters 340 distributed at the site are pointed out in the map. The presented locations are selectable by the operator, for example by touching the location in the case of a touchscreen or by clicking at the location with a mouse, etc. The operator shall select the location of the replaced radio transmitter. Operator device 320 detects a selection and forwards the selection to server 300. (action 523)

Server 300 detects the selection of a transmitter location and determines an associated radio transmitter ID. The association is stored in memory 304. Furthermore, server 300 queries the ID of the new radio transmitter from the operator device 320. (action 505)

The operator is caused by server 300 via the radio map control UI to input the ID of the new radio transmitter. (action 524) The ID may be input manually, using a tool or using a previous recordal of the ID.

Server 300 receives the input. It replaces the ID of the old radio transmitter in the database entry for this transmitter with the ID of the new radio transmitter. (action 506) As a result, the radio map data of the old transmitter is automatically associated with the new radio transmitter.

The following example MySQL command replaces the ID "MAC_1" of the broken radio transmitter in the database entry of the original radio map database with the ID "MAC_2" of the new radio transmitter:

UPDATE radio_map_table SET MAC=MAC_2' WHERE MAC='MAC_1';

The resulting updated database may have the following format and content:

| Radio_map_database radio_map_table | | |
|---|---|---|
| MAC | Radio_Map | Created |
| MAC_2 | Radio map of MAC1 | 02/1/2017 10:39 |

A mobile user device 330 that is located at the site may perform measurements on radio signals and transmit positioning requests, whenever information on its position is needed, as described with reference to action 431. (action 531)

Server 300 may support the positioning as described with reference to action 405. (action 507)

It is to be understood that the presented example systems, apparatuses and operations may be varied in many ways. The systems and apparatuses may be varied for instance by modifying, adding or omitting components. The operations may be varied for instance by modifying actions, by omitting actions and/or by adding actions. In addition, the order of actions may be modified.

For example, in an alternative embodiment, there may be no separate operator device 320. Instead, an operator could make use of a user interface of server 300.

For example, in an alternative embodiment, the radio transmitters 340 may include other transmitters than BLE beacons or WLAN access points, for example regular Bluetooth transmitters or ultra-sound transmitters, etc.

For example, in an alternative embodiment mobile data collection devices 310 may not determine and provide locations of measurements in action 411 of FIG. 4 or action 511 of FIG. 5. Instead, it may provide data to server 300 that enables server 300 to determine the locations of measurements.

For example, the ID selection of the old radio transmitter using a map, as presented with reference to FIG. 5, could also be used in the embodiment of FIG. 4; and the manual input of the ID of the old radio transmitter, as presented with reference to FIG. 4, could also be used in the embodiment of FIG. 5.

Summarized, certain embodiments of the disclosed embodiments may allow an operator to associate radio map data of a broken radio transmitter with a new replacement radio transmitter. This may save time, which would have to be spent in re-surveying a site to determine radio map data for the new radio transmitter. It also saves processing power that would be needed for generating the radio map data for the new radio transmitter based on data resulting in a new survey. Furthermore, problems resulting with coverage areas that are only accessible with difficulties for a survey are avoided.

The following embodiments are also disclosed:

Embodiment 1

A method comprising, performed by at least one apparatus:
  receiving user input based information that allows deriving an identifier of a first radio transmitter, wherein a database stores, associated with the identifier of the first radio transmitter, information that allows deriving expected characteristics of radio signals of the first radio transmitter at different locations of a site;
  receiving a user input based indication of a replacement of the first radio transmitter at the site;
  receiving user input based information that allows deriving an identifier of a second radio transmitter replacing the first radio transmitter at the site; and
  updating the database by associating the information that allows deriving expected characteristics of radio signals of the first radio transmitter at different locations of the site with the identifier of the second radio transmitter.

Embodiment 2

The method according to embodiment 1, comprising preceding actions of:
  receiving results of measurements on radio signals by at least one mobile device at different locations at the site; and
  creating the information that allows deriving expected characteristics of radio signals of the first radio transmitter at different locations of a site based on the results of measurements.

Embodiment 3

The method according to embodiment 1 or 2, further comprising using the information in the updated database for determining a position of a mobile device at the site.

Embodiment 4

The method according to any one of embodiments 1 to 3, wherein updating the database comprises:
  replacing the identifier of the first radio transmitter with the identifier of the second radio transmitter in a database entry, which associates the information that allows deriving expected characteristics of radio signals of the first radio transmitter at different locations of the site with the identifier of the first radio transmitter.

Embodiment 5

The method according to any one of embodiments 1 to 3, wherein the database comprises a database entry associating the information that allows deriving expected characteristics of radio signals of the first radio transmitter at different locations of the site with the identifier of the first radio transmitter, and wherein updating the database comprises:
  adding a database entry associating the information that allows deriving expected characteristics of radio signals of the first radio transmitter at different locations of the site with the identifier of the second radio transmitter; and
  deleting the database entry associating the information that allows deriving expected characteristics of radio signals of the first radio transmitter at different locations of the site with the identifier of the first radio transmitter.

Embodiment 6

The method according to any one of embodiments 1 to 5, wherein receiving user input based information that allows deriving the identifier of the second radio transmitter comprises:

receiving an identifier of the second radio transmitter based on a manual input of a user to a device; or
receiving an identifier of the second radio transmitter based on an output of a tool reading the identifier from the second radio transmitter.

Embodiment 7

The method according to any one of embodiments 1 to 6, wherein receiving user input based information that allows deriving the identifier of the first radio transmitter comprises:
receiving an identifier of the first radio transmitter based on a manual input of a user to a device; or
receiving an identifier of the first radio transmitter based on an output of a tool reading the identifier from the first radio transmitter.

Embodiment 8

The method according to any one of embodiments 1 to 6, wherein receiving user input based information that allows deriving the identifier of the first radio transmitter comprises:
causing presentation of a map on a display of a device, the map including a visualization of locations of a plurality of radio transmitters at the site, for which a respective database entry is stored in the database, each database entry associating information that allows deriving expected characteristics of radio signals of a radio transmitter at different locations of the site with an identifier of the radio transmitter;
receiving an input indicating one of the locations on the display; and
determining an identifier of a radio transmitter at the indicated location as the identifier of the first radio transmitter.

Embodiment 9

A system comprising at least one apparatus, the at least one apparatus comprising means for causing performance of the actions of the method of any one of embodiments 1 to 8.

Embodiment 10

The system according to embodiment 9, wherein the system is:
a module for a computer; or
a computer; or
a combination of a plurality of computers.

Embodiment 11

A system comprising at least one processor and at least one memory, wherein the at least one memory includes computer program code, the at least one memory and the computer program code configured to, with the at least one processor, cause at least one device at least to:
receive user input based information that allows deriving an identifier of a first radio transmitter, wherein a database stores, associated with the identifier of the first radio transmitter, information that allows deriving expected characteristics of radio signals of the first radio transmitter at different locations of a site;
receive a user input based indication of a replacement of the first radio transmitter at the site;
receive user input based information that allows deriving an identifier of a second radio transmitter replacing the first radio transmitter at the site; and
update the database by associating the information that allows deriving expected characteristics of radio signals of the first radio transmitter at different locations of the site with the identifier of the second radio transmitter.

Embodiment 12

The system according to embodiment 11, wherein the at least one memory and the computer program code are configured to, with the at least one processor, cause the at least one device to perform the preceding actions of:
receive results of measurements on radio signals by at least one mobile device at different locations at the site; and
create the information that allows deriving expected characteristics of radio signals of the first radio transmitter at different locations of a site based on the results of measurements.

Embodiment 13

The system according to embodiment 11 or 12, wherein the at least one memory and the computer program code are configured to, with the at least one processor, cause the at least one device to use the information in the updated database for determining a position of a mobile device at the site.

Embodiment 14

The system according to any one of embodiments 11 to 13, wherein updating the database comprises:
replacing the identifier of the first radio transmitter with the identifier of the second radio transmitter in a database entry, which associates the information that allows deriving expected characteristics of radio signals of the first radio transmitter at different locations of the site with the identifier of the first radio transmitter.

Embodiment 15

The system according to any one of embodiments 11 to 13, wherein the database comprises a database entry associating the information that allows deriving expected characteristics of radio signals of the first radio transmitter at different locations of the site with the identifier of the first radio transmitter, and wherein updating the database comprises:
adding a database entry associating the information that allows deriving expected characteristics of radio signals of the first radio transmitter at different locations of the site with the identifier of the second radio transmitter; and
deleting the database entry associating the information that allows deriving expected characteristics of radio signals of the first radio transmitter at different locations of the site with the identifier of the first radio transmitter.

Embodiment 16

The system according to any one of embodiments 11 to 15, wherein receiving user input based information that allows deriving the identifier of the second radio transmitter comprises:

receiving an identifier of the second radio transmitter based on a manual input of a user to a device; or
receiving an identifier of the second radio transmitter based on an output of a tool reading the identifier from the second radio transmitter.

Embodiment 17

The system according to any one of embodiments 11 to 16, wherein receiving user input based information that allows deriving the identifier of the first radio transmitter comprises:
receiving an identifier of the first radio transmitter based on a manual input of a user to a device; or
receiving an identifier of the first radio transmitter based on an output of a tool reading the identifier from the first radio transmitter.

Embodiment 18

The system according to any one of embodiments 11 to 16, wherein receiving user input based information that allows deriving the identifier of the first radio transmitter comprises:
causing presentation of a map on a display of a device, the map including a visualization of locations of a plurality of radio transmitters at the site, for which a respective database entry is stored in the database, each database entry associating information that allows deriving expected characteristics of radio signals of a radio transmitter at different locations of the site with an identifier of the radio transmitter;
receiving an input indicating one of the locations on the display; and
determining an identifier of a radio transmitter at the indicated location as the identifier of the first radio transmitter.

Embodiment 19

The system according to any of embodiments 11 to 18, wherein the system is:
a module for a computer; or
a computer; or
a combination of a plurality of computers.

Embodiment 20

A computer program code, which is configured to causes at least one device to perform the actions of the methods of any one of embodiments 1 to 8 when executed by at least one processor.

Embodiment 21

A computer readable storage medium in which computer program code is stored, the computer program code causing at least one device to perform the following when executed by at least one processor:
receive user input based information that allows deriving an identifier of a first radio transmitter, wherein a database stores, associated with the identifier of the first radio transmitter, information that allows deriving expected characteristics of radio signals of the first radio transmitter at different locations of a site;
receive a user input based indication of a replacement of the first radio transmitter at the site;
receive user input based information that allows deriving an identifier of a second radio transmitter replacing the first radio transmitter at the site; and
update the database by associating the information that allows deriving expected characteristics of radio signals of the first radio transmitter at different locations of the site with the identifier of the second radio transmitter.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

A bus may be provided for connecting processor(s) and memories.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

In example embodiments, any non-transitory computer readable medium mentioned in this text could also be a removable/portable storage or a part of a removable/portable storage instead of an integrated storage. Example embodiments of such a removable storage comprise a magnetic disc storage, of an optical disc storage, a semiconductor memory circuit device storage and of a Micro-SD semiconductor memory card storage.

The functions illustrated by processor 101 in combination with memory 102, or processor 301 in combination with memory 302, or component 303 can also be viewed as means for receiving user input based information that allows deriving an identifier of a first radio transmitter, wherein a database stores, associated with the identifier of the first radio transmitter, information that allows deriving expected characteristics of radio signals of the first radio transmitter at different locations of a site; means for receiving a user input based indication of a replacement of the first radio transmitter at the site; means for receiving user input based information that allows deriving an identifier of a second radio transmitter replacing the first radio transmitter at the site; and means for updating the database by associating the information that allows deriving expected characteristics of radio signals of the first radio transmitter at different locations of the site with the identifier of the second radio transmitter.

The program codes in memory 102 and memory 302 can also be viewed as comprising such means in the form of functional modules.

FIGS. 2, 4 and 5 may also be understood to represent example functional blocks of computer program codes supporting an update of radio map data.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method, performed by at least one apparatus, the method comprising:
    receiving user input based information that allows deriving an identifier of a first radio transmitter, wherein a database stores, associated with the identifier of the first radio transmitter, a radio map including information that allows deriving expected characteristics of radio signals of the first radio transmitter at different locations of a site;
    receiving a user input based indication of a replacement of the first radio transmitter at the site;
    receiving user input based information that allows deriving an identifier of a second radio transmitter replacing the first radio transmitter at the site;
    associating, in the database, the radio map of the first radio transmitter at different locations of the site with the identifier of the second radio transmitter; and
    calculating a position of a mobile device at the site through a comparison of signal measurements taken at the mobile device to the radio map in the database including the radio map of the first radio transmitter associated with the identifier of the second radio transmitter.

2. The method according to claim 1, comprising preceding actions of:
    receiving results of measurements on radio signals by at least one mobile device at different locations at the site; and
    creating the information that allows deriving expected characteristics of radio signals of the first radio transmitter at different locations of a site based on the results of measurements.

3. The method according to claim 1, wherein updating the database comprises:
    replacing the identifier of the first radio transmitter with the identifier of the second radio transmitter in a database entry, which associates the information that allows deriving expected characteristics of radio signals of the first radio transmitter at different locations of the site with the identifier of the first radio transmitter.

4. The method according to claim 1, wherein the database comprises a database entry associating the information that allows deriving expected characteristics of radio signals of the first radio transmitter at different locations of the site with the identifier of the first radio transmitter, and wherein updating the database comprises:
    adding a database entry associating the information that allows deriving expected characteristics of radio signals of the first radio transmitter at different locations of the site with the identifier of the second radio transmitter; and
    deleting the database entry associating the information that allows deriving expected characteristics of radio signals of the first radio transmitter at different locations of the site with the identifier of the first radio transmitter.

5. The method according to claim 1, wherein receiving user input based information that allows deriving the identifier of the second radio transmitter comprises:
    receiving an identifier of the second radio transmitter based on a manual input of a user to a device; or
    receiving an identifier of the second radio transmitter based on an output of a tool reading the identifier from the second radio transmitter.

6. The method according to claim 1, wherein receiving user input based information that allows deriving the identifier of the first radio transmitter comprises:
    receiving an identifier of the first radio transmitter based on a manual input of a user to a device; or
    receiving an identifier of the first radio transmitter based on an output of a tool reading the identifier from the first radio transmitter.

7. The method according to claim 1, wherein receiving user input based information that allows deriving the identifier of the first radio transmitter comprises:
    causing presentation of a map on a display of a device, the map including a visualization of locations of a plurality of radio transmitters at the site, for which a respective database entry is stored in the database, each database entry associating information that allows deriving expected characteristics of radio signals of a radio transmitter at different locations of the site with an identifier of the radio transmitter;
    receiving an input indicating one of the locations on the display; and
    determining an identifier of a radio transmitter at the indicated location as the identifier of the first radio transmitter.

8. A system comprising at least one processor and at least one memory, wherein the at least one memory includes computer program code, the at least one memory and the computer program code configured to, with the at least one processor, cause at least one device at least to:
    receive user input based information that allows deriving an identifier of a first radio transmitter, wherein a database stores, associated with the identifier of the first radio transmitter, a radio map including information that allows deriving expected characteristics of radio signals of the first radio transmitter at different locations of a site;

receive a user input based indication of a replacement of the first radio transmitter at the site;

receive user input based information that allows deriving an identifier of a second radio transmitter replacing the first radio transmitter at the site;

update the database by associating the radio map of the first radio transmitter at different locations of the site with the identifier of the second radio transmitter; and determining a position of a mobile device at the site through a comparison of measurement taken by the mobile device to the radio map in the updated database.

9. The system according to claim 8, wherein the at least one memory and the computer program code are configured to, with the at least one processor, cause the at least one device to perform the preceding actions of:

receive results of measurements on radio signals by at least one mobile device at different locations at the site; and create the information that allows deriving expected characteristics of radio signals of the first radio transmitter at different locations of a site based on the results of measurements.

10. The system according to claim 8, wherein update the database comprises:

replace the identifier of the first radio transmitter with the identifier of the second radio transmitter in a database entry, which associates the information that allows deriving expected characteristics of radio signals of the first radio transmitter at different locations of the site with the identifier of the first radio transmitter.

11. The system according to claim 8, wherein the database comprises a database entry associating the information that allows deriving expected characteristics of radio signals of the first radio transmitter at different locations of the site with the identifier of the first radio transmitter, and wherein update the database comprises:

add a database entry associating the information that allows deriving expected characteristics of radio signals of the first radio transmitter at different locations of the site with the identifier of the second radio transmitter; and delete the database entry associating the information that allows deriving expected characteristics of radio signals of the first radio transmitter at different locations of the site with the identifier of the first radio transmitter.

12. The system according to claim 8, wherein receive user input based information that allows deriving the identifier of the second radio transmitter comprises:

receive an identifier of the second radio transmitter based on a manual input of a user to a device; or receive an identifier of the second radio transmitter based on an output of a tool reading the identifier from the second radio transmitter.

13. The system according to claim 8, wherein receive user input based information that allows deriving the identifier of the first radio transmitter comprises:

receive an identifier of the first radio transmitter based on a manual input of a user to a device; or receive an identifier of the first radio transmitter based on an output of a tool reading the identifier from the first radio transmitter.

14. The system according to claim 8, wherein receive user input based information that allows deriving the identifier of the first radio transmitter comprises:

cause presentation of a map on a display of a device, the map including a visualization of locations of a plurality of radio transmitters at the site, for which a respective database entry is stored in the database, each database entry associating information that allows deriving expected characteristics of radio signals of a radio transmitter at different locations of the site with an identifier of the radio transmitter;

receive an input indicating one of the locations on the display; and determine an identifier of a radio transmitter at the indicated location as the identifier of the first radio transmitter.

15. The system according to claim 8, wherein the system is:

a module for a computer; or a computer; or a combination of a plurality of computers.

16. A non-transitory computer readable storage medium in which computer program code is stored, the computer program code causing at least one device to perform the following when executed by at least one processor:

receive user input based information that allows deriving an identifier of a first radio transmitter, wherein a database stores, associated with the identifier of the first radio transmitter, a radio map including information that allows deriving expected characteristics of radio signals of the first radio transmitter at different locations of a site;

receive a user input based indication of a replacement of the first radio transmitter at the site;

receive user input based information that allows deriving an identifier of a second radio transmitter replacing the first radio transmitter at the site;

update the database by associating the radio map of the first radio transmitter at different locations of the site with the identifier of the second radio transmitter; and calculate a position based on the expected characteristics of radio signals of the first radio transmitter associated with the identifier of the second radio transmitter.

* * * * *